US012809428B2

(12) United States Patent
Chung et al.

(10) Patent No.: US 12,809,428 B2
(45) Date of Patent: Nov. 24, 2026

(54) ELECTRONIC DEVICE

(71) Applicant: ASUSTek COMPUTER INC., Taipei City (TW)

(72) Inventors: Ying-Kai Chung, Taipei City (TW); Yu-Jen Chen, Taipei City (TW); Chun-Mao Tseng, Taipei City (TW); Yan-Jhang Cheng, Taipei City (TW); Min-Che Kao, Taipei City (TW); Kun-Lin Hsieh, Taipei City (TW)

(73) Assignee: ASUSTek COMPUTER INC., Taipei City (TW)

( * ) Notice: Subject to any disclaimer, the term of this patent is extended or adjusted under 35 U.S.C. 154(b) by 82 days.

(21) Appl. No.: 18/976,351

(22) Filed: Dec. 11, 2024

(65) Prior Publication Data

US 2026/0126832 A1 May 7, 2026

(30) Foreign Application Priority Data

Nov. 7, 2024 (TW) ................................ 113142681

(51) Int. Cl.
*G06F 1/16* (2006.01)

(52) U.S. Cl.
CPC .......... *G06F 1/1681* (2013.01); *G06F 1/1616* (2013.01)

(58) Field of Classification Search
CPC .... G06F 1/1613; G06F 1/1615; G06F 1/1616; G06F 1/1681
See application file for complete search history.

(56) References Cited

U.S. PATENT DOCUMENTS

| | | | | |
|---|---|---|---|---|
| 9,075,567 | B2 * | 7/2015 | Mathew | G06F 1/1616 |
| 9,104,382 | B2 * | 8/2015 | Chen | G06F 1/1681 |
| 10,185,369 | B1 * | 1/2019 | Yu | G06F 1/1616 |
| 10,852,775 | B1 * | 12/2020 | Kim | G06F 1/203 |
| 11,573,602 | B2 * | 2/2023 | Lin | G06F 1/1641 |
| 2022/0129043 | A1 * | 4/2022 | Morrison | G06F 1/165 |
| 2024/0369097 | A1 * | 11/2024 | Chen | G06F 1/203 |
| 2024/0419211 | A1 * | 12/2024 | Liu | G06F 1/1652 |
| 2025/0138593 | A1 * | 5/2025 | Wang | G06F 1/1616 |
| 2025/0231595 | A1 * | 7/2025 | Liu | G06F 1/1681 |

FOREIGN PATENT DOCUMENTS

| | | |
|---|---|---|
| CN | 114442747 | 5/2022 |
| CN | 116483179 | 7/2023 |

* cited by examiner

*Primary Examiner* — Anthony Q Edwards
(74) *Attorney, Agent, or Firm* — JCIPRNET

(57) ABSTRACT

An electronic device including a first body, a second body with a first casing and a second casing and a hinge structure is provided. The first casing has a top surface facing the second casing, first step and second step protrude from the top surface. A height of the first step is higher than a height of the second step. The hinge structure includes a rotating shaft and a locking piece. The rotating shaft is connected to the first body and the second body. The locking piece is configured adjacent to the rotating shaft and has a first assembly part, a second assembly part and a third assembly part connected in sequence, wherein the first assembly part is supported and fixed on the first step, the second assembly part is supported and fixed on the second step, and the third assembly part covers at least part of the rotating shaft.

8 Claims, 4 Drawing Sheets

ELECTRONIC DEVICE

CROSS-REFERENCE TO RELATED APPLICATION

This application claims the priority benefit of Taiwan application serial no. 113142681, filed on Nov. 7, 2024. The entirety of the above-mentioned patent application is hereby incorporated by reference herein and made a part of this specification.

BACKGROUND

Technical Field

The application relates to a device, and in particular, to an electronic device.

Description of Related Art

FIG. 1 is a schematic diagram illustrating a pivot of a conventional electronic device fixed to the casing.

Referring to FIG. 1, in the conventional electronic device, one end 112 of the locking piece 11 of the pivot 1 covers the rotating shaft 12, and the other end 114 is locked on the protruding locking platform 21 inside the casing 2. The part between the two ends of the locking piece 11 is supported on the surface 2*a* of the casing 2.

However, although part of the locking piece 11 is supported on the casing 2 to provide supporting force, the height of the locking platform 21 protruding from the surface 2*a* of the casing 2 is quite high, resulting in a longer overall length of the locking piece 11. This causes the locking piece 11 to provide a large torque to the rotating shaft 12. Therefore, when the screen-side is opened or closed relative to the logic end, there is a noticeable shaking sensation.

SUMMARY

The electronic device of the application has rotational stability when the first body rotates relative to the second body.

The application provides an electronic device, including a first body, a second body, and a hinge structure. The second body includes a first casing and a second casing. The first casing has a surface facing the second casing and a first step and a second step protruding from the surface, wherein the height of the first step is greater than the height of the second step. The hinge structure includes a rotating shaft and a locking piece. The rotating shaft is connected to the first body and the second body. The locking piece is adjacent to the rotating shaft and has a first assembly part, a second assembly part, and a third assembly part sequentially connected. The first assembly part is supported and fixed on the first step, while the second assembly part is supported and fixed on the second step. The third assembly part covers at least a portion of the rotating shaft.

Based on the above, in the electronic device of the application, by adjusting the step difference range between the heights of the first step and the second step set on the first casing, the stability of the first body rotating relative to the second body of the electronic device may be improved.

DESCRIPTION OF THE EMBODIMENTS

Figure 1:
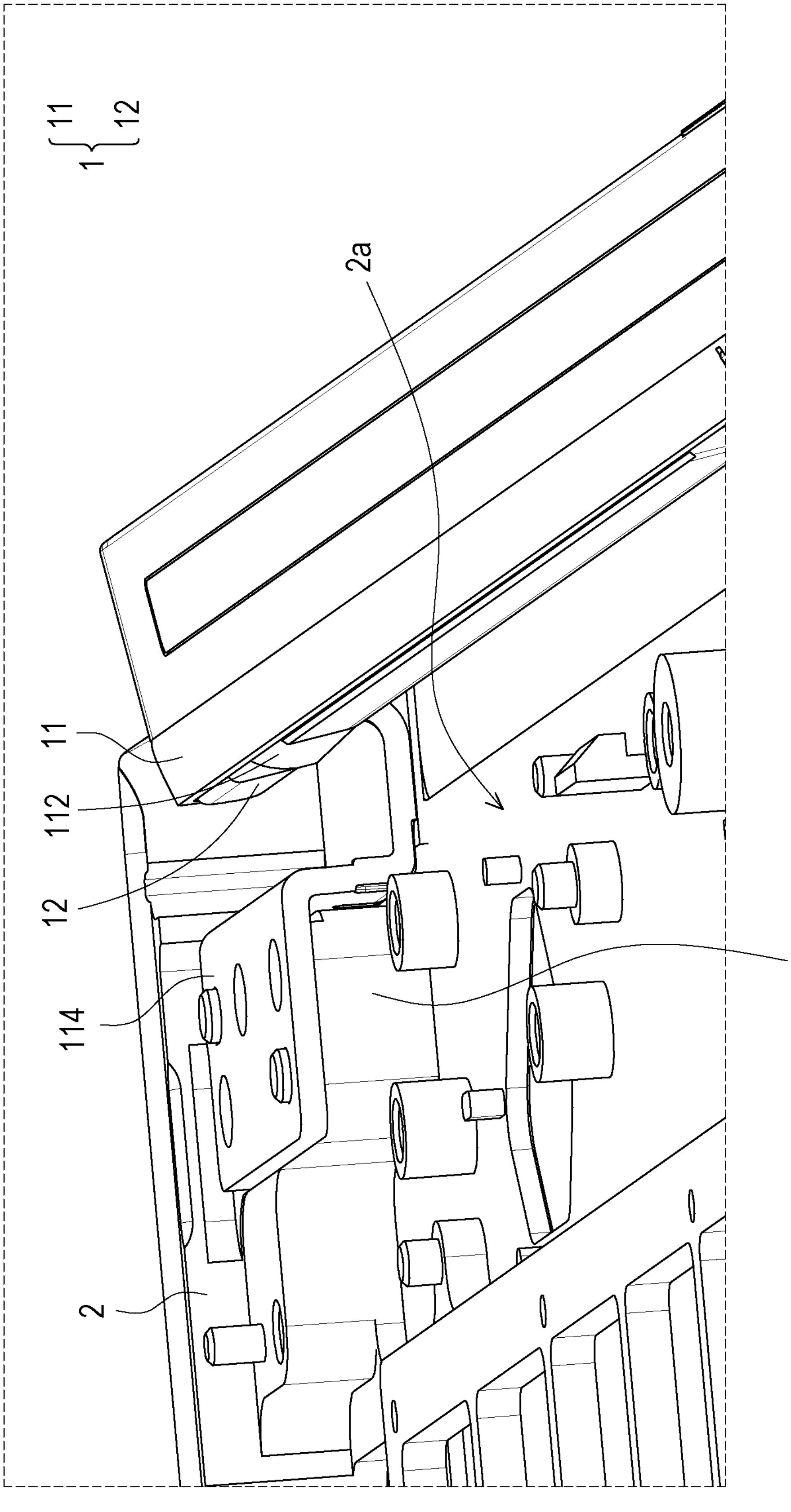
FIG. 1 (PRIOR ART)
FIG. 1 is a schematic diagram illustrating a pivot of a conventional electronic device fixed to the casing.
Figure 2:
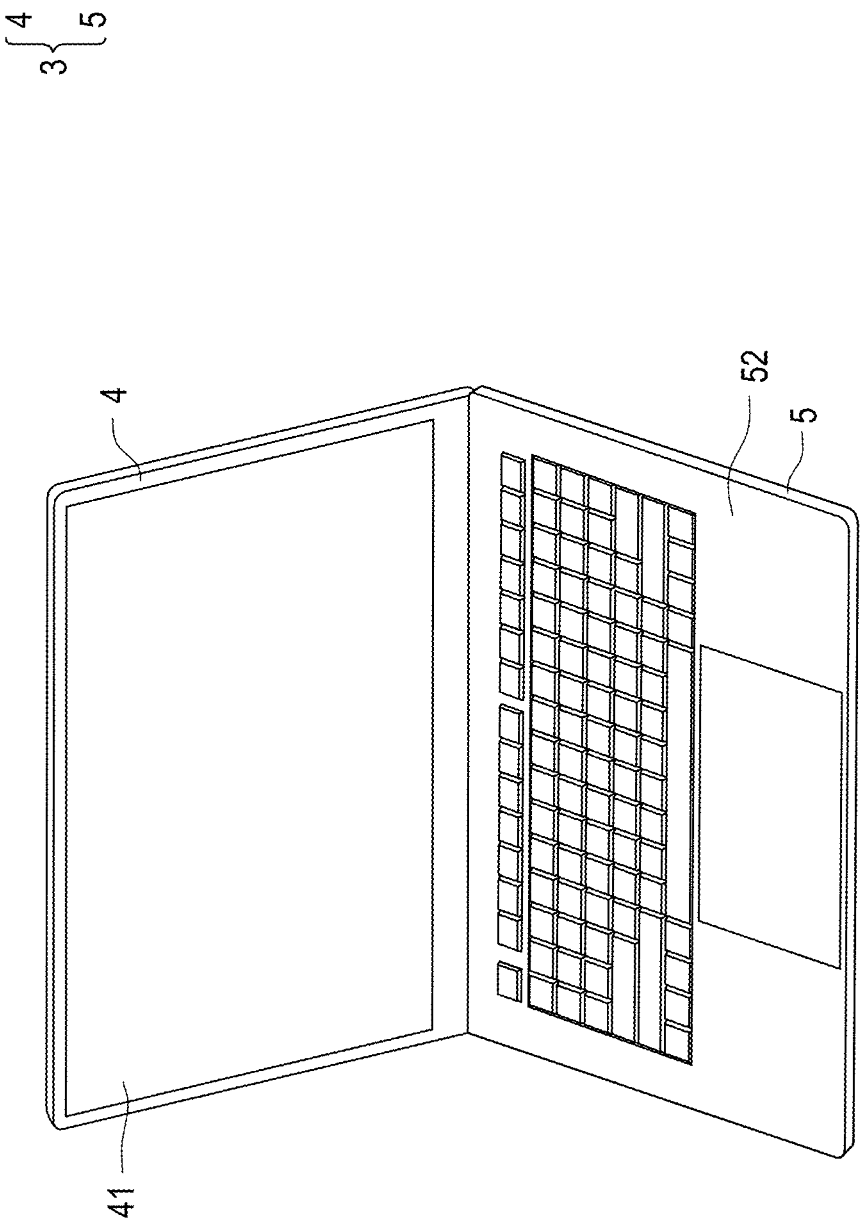
FIG. 2 is a three-dimensional schematic diagram of the electronic device.
Figure 3:
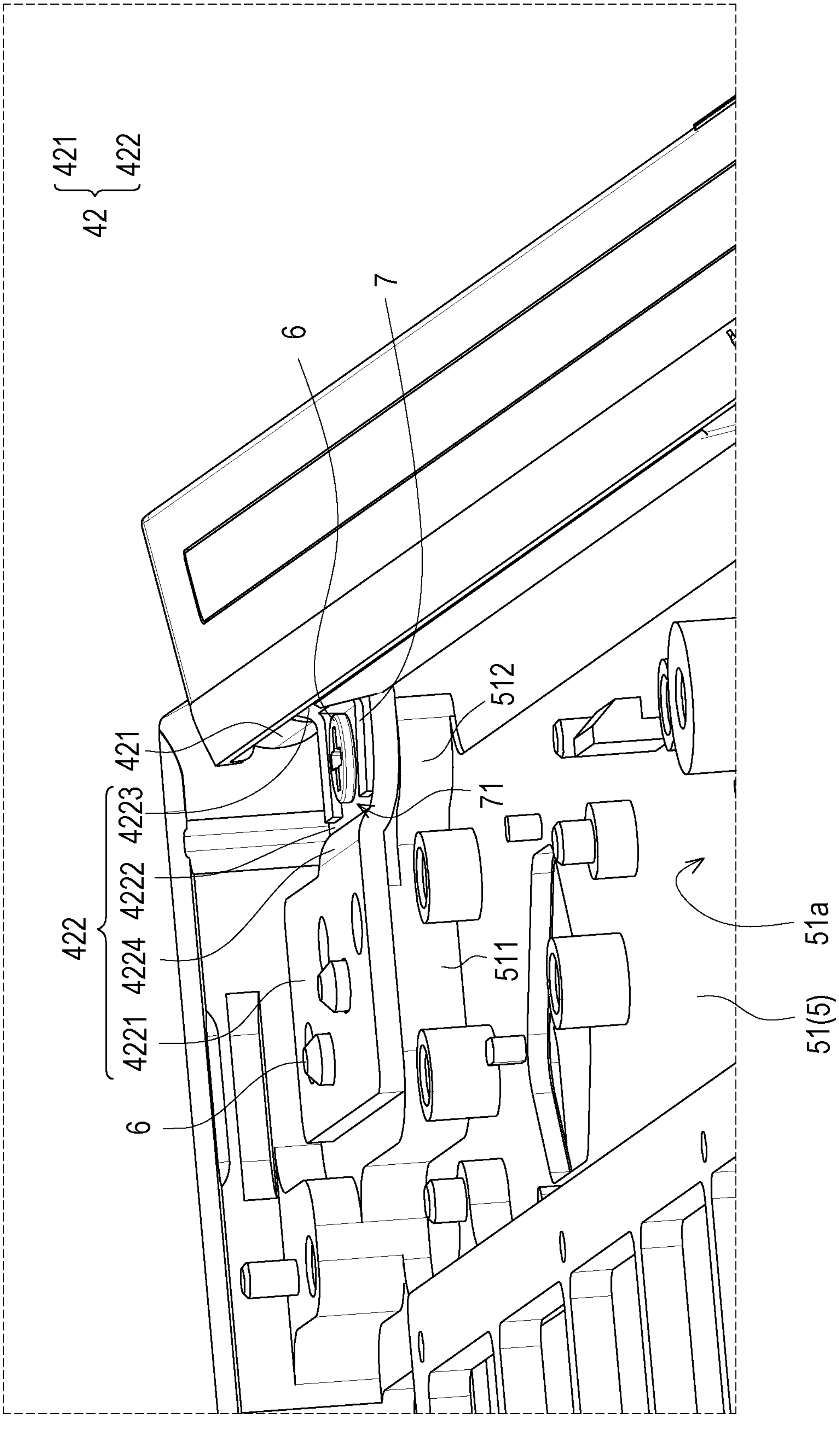
FIG. 3 is a local schematic diagram of the electronic device of FIG. 2.

FIG. 2 is a three-dimensional schematic diagram of the electronic device, and FIG. 3 is a local schematic diagram of the electronic device of FIG. 2. Referring to FIG. 2 and FIG. 3 at the same time, the electronic device 3 of the embodiment includes a first body 4, a second body 5, and a hinge structure 42.

In an implementation, the first body 4 has a screen 41, and the second body 5 is a system host. However, the application is not limited to this.

The second body 5 includes a first casing 51 and a second casing 52, wherein the second casing 52 is assembled with the first casing 51 to jointly construct an accommodation space (not marked), and electronic components such as the motherboard (not marked) and memory (not marked) are set in this accommodation space. The first casing 51 has a surface 51*a* faced towards the second casing 52 and a first step 511 and a second step 512 protruding from the surface 51*a*, wherein the height of the first step 511 is greater than the height of the second step 512.

The hinge structure 42 is set at a side where the first body 4 and the second body 5 approach each other, wherein the hinge structure 42 pivotally connects the first body 4 and the second body 5 together, enabling the first body 4 and the second body 5 to open and close relative to each other.

The aforementioned hinge structure 42 includes a rotating shaft 421 and a locking piece 422. The locking piece 422 has a first assembly part 4221, a second assembly part 4222, and a third assembly part 4223, wherein the first assembly part 4221 supports and is fixed to the first step 511. While the second assembly part 4222 supports and is fixed to the second step 512, and the third assembly part 4223 covers at least a portion of the rotating shaft 421.

In the embodiment, the first step 511 protrudes from the surface 51*a* by approximately 2.6 mm, while the step difference range between the first step 511 and the second step 512 is between 0.4~0.6 mm.

In the embodiment, the first step 511 and the second step 512 are connected to each other. In other words, the first step 511 and the second step 512 are set closely adjacent to each other.

Figure 4:
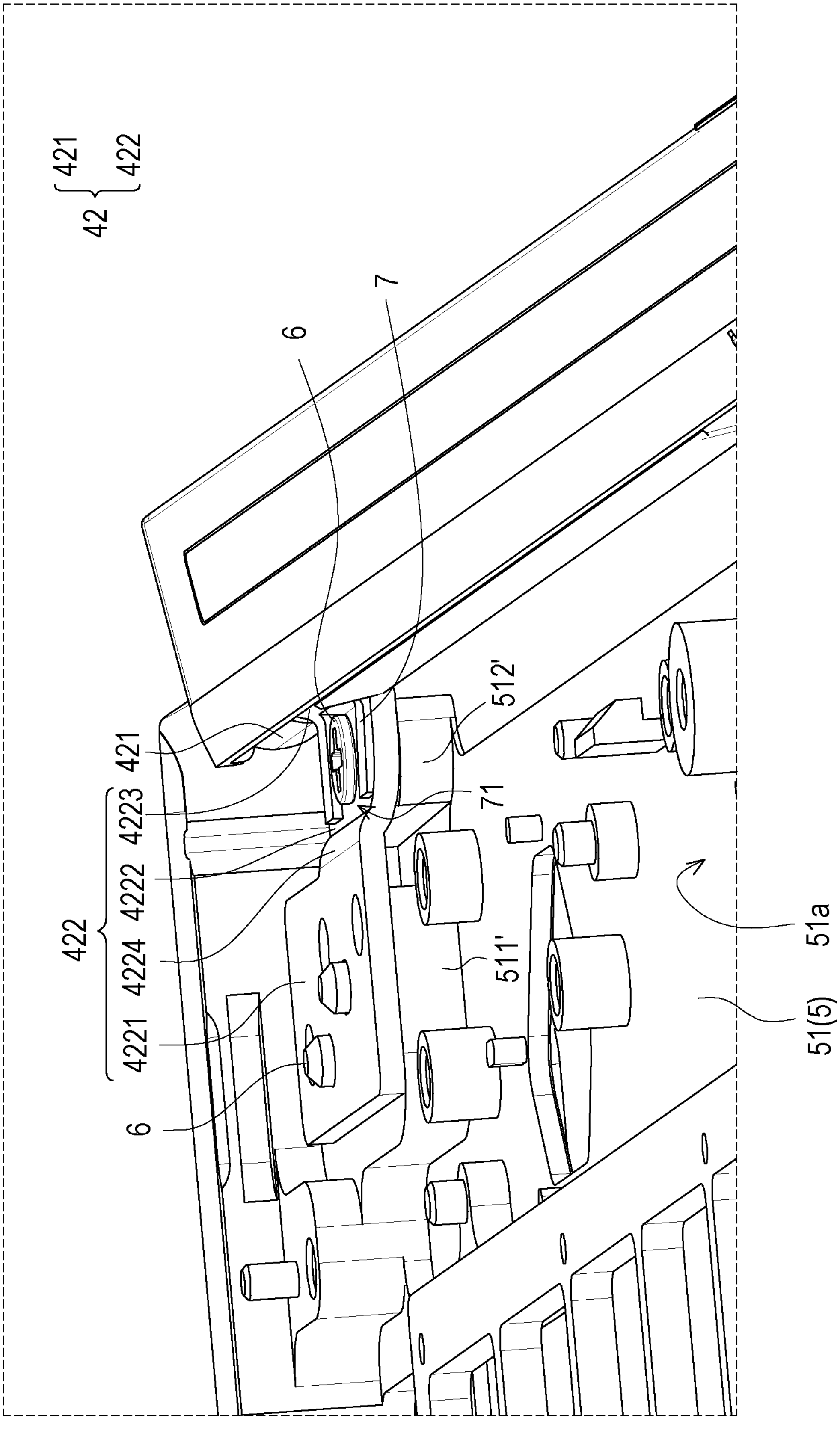
FIG. 4 is a schematic diagram illustrating the first step and the second step spaced apart by a distance.

FIG. 4 is a schematic diagram illustrating the first step and the second step spaced apart by a distance. In the implementation as shown in FIG. 4, it may also be that a first step 511' and a second step 512' have a gap between them. In other words, the first step 511' and the second step 512' are set spaced apart by a distance.

Referring to FIG. 2 and FIG. 3 continually. Furthermore, the locking piece 422 also includes a connecting part 4224 that is inclinedly connected between the first assembly part 4221 and the second assembly part 4222, and the range of the slope of the connecting part 4224 is between 0.3~0.5.

The electronic device 3 also includes multiple locking parts 6, which correspondingly pass through the locking piece 422 and lock into the first step 511 and the second step 512, to fix the first assembly part 4221 to the first step 511 and the second assembly part 4222 to the second step 512.

By setting the first step 511 and the second step 512 on the surface 51*a* of the first casing 51, and correspondingly fixing the first assembly part 4221 of the locking piece 422 to the first step 511 and the second assembly part 4222 to the second step 512. Since the second assembly part 4222 between the first assembly part 4221 and the third assembly part 4223 of the locking part 6 is fixed at the second step 512, it provides an additional force support point for the locking part 6 relatively closer to the rotating shaft 421. Therefore, the distance is shortened between the rotating shaft 421 and the fixing point (that is, where the locking part 6 locks into the second assembly part 4222), thereby reducing the torque, and consequently enhancing the rotational stability when the first body 4 and the second body 5 rotate relative to each other, mitigating the shaking situation.

Moreover, in the embodiment, the height of the first step 511 is lower than the height of the conventional locking platform in electronic devices, therefore the overall length of the locking piece 422 may be reduced.

Additionally, since the height difference between the first step 511 and the second step 512 is not significant, the connecting part 4224 of the first assembly part 4221 and the second assembly part 4222 of the locking piece 422 may be set inclinedly, which, compared to the prior art, can also achieve the technical effect of reducing the overall length of the locking piece 422.

The smaller the height difference between the aforementioned first step 511 and second step 512, the better the effect of preventing shaking when the body rotates.

Following the above, the electronic device 3 also includes a buffer piece 7 that covers the locking piece 422. This buffer piece 7 may be made of rubber or silicone. The buffer piece 7 has an avoidance area 71, and one of the locking parts 6 is located within the avoidance area 71.

In summary, in the electronic device of the application, the second step with the height lower than the first step is additionally set between the first step and the rotating shaft on the first casing, and the second assembly part of the locking piece is assembled and fixed to the second step. Therefore, the hinge structure has a fixing point closer to the rotating shaft, thus effectively reducing the torque, and consequently increasing the stability when the first body of the electronic device rotates relative to the second body.

What is claimed is:

1. An electronic device, comprising:

a first body;

a second body, comprising a first casing and a second casing, the first casing having a surface oriented towards the second casing and a first step and a second step protruding from the surface, wherein the height of the first step is greater than the height of the second step; and a hinge structure, comprising:

a rotating shaft, connected to the first body and the second body; and a locking piece, adjacent to the rotating shaft, having a first assembly part, a second assembly part, and a third assembly part connected in sequence;

wherein the first assembly part is supported and fixed on the first step, the second assembly part is supported and fixed on the second step, and the third assembly part covers at least a portion of the rotating shaft.

2. The electronic device as claimed in claim 1, wherein the step difference range between the first step and the second step is between 0.4~0.6 mm.

3. The electronic device as claimed in claim 1, wherein the locking piece further comprises a connecting part inclinedly connected between the first assembly part and the second assembly part.

4. The electronic device as claimed in claim 3, wherein the range of the slope of the connecting part is between 0.3~0.5.

5. The electronic device as claimed in claim 1, further comprising a plurality of locking parts, passing through the locking piece and locking into the first step and the second step correspondingly.

6. The electronic device as claimed in claim 5, further comprising a buffer piece, covering the locking piece, wherein the buffer piece has an avoidance area, and one of the locking parts is located within the avoidance area.

7. The electronic device as claimed in claim 1, wherein the first step and the second step are connected to each other.

8. The electronic device as claimed in claim 1, wherein there is a gap between the first step and the second step.

* * * * *